United States Patent
Pegado et al.

(10) Patent No.: US 11,912,631 B2
(45) Date of Patent: Feb. 27, 2024

(54) METHOD FOR THE KINETIC REGULATION OF CEMENTITIOUS BINDERS

(71) Applicant: SIKA TECHNOLOGY AG, Baar (CH)

(72) Inventors: Luis Pegado, Brugg (CH); Emmanuel Gallucci, Zürich (CH); Arnd Eberhardt, Winterthur (CH); Patrick Juilland, Bern (CH); Denise Schönenberger, Kollbrunn (CH); Letizia Caderas, Basel (CH)

(73) Assignee: SIKA TECHNOLOGY AG, Baar (CH)

( * ) Notice: Subject to any disclaimer, the term of this patent is extended or adjusted under 35 U.S.C. 154(b) by 153 days.

(21) Appl. No.: 17/618,913

(22) PCT Filed: Jun. 12, 2020

(86) PCT No.: PCT/EP2020/066410
§ 371 (c)(1),
(2) Date: Dec. 14, 2021

(87) PCT Pub. No.: WO2020/249805
PCT Pub. Date: Dec. 17, 2020

(65) Prior Publication Data
US 2022/0306530 A1    Sep. 29, 2022

(30) Foreign Application Priority Data
Jun. 14, 2019 (EP) .................... 19180247

(51) Int. Cl.
*C04B 9/12* (2006.01)
*C04B 7/02* (2006.01)
*C04B 7/32* (2006.01)
*C04B 7/52* (2006.01)

(52) U.S. Cl.
CPC .................. *C04B 9/12* (2013.01); *C04B 7/02* (2013.01); *C04B 7/323* (2013.01); *C04B 7/522* (2013.01)

(58) Field of Classification Search
CPC .. C04B 9/12; C04B 7/02; C04B 7/323; C04B 7/522; C04B 28/065; C04B 28/06; C04B 28/04
See application file for complete search history.

(56) References Cited

U.S. PATENT DOCUMENTS

| 2,006,426 | A | 7/1935 | Weiler |
| 3,645,750 | A | 2/1972 | Sadran |
| 3,954,489 | A | 5/1976 | Uchikawa et al. |
| 4,544,409 | A | 10/1985 | Daussan et al. |
| 9,868,674 | B2 | 1/2018 | Li et al. |

FOREIGN PATENT DOCUMENTS

| CN | 106866086 A | 6/2017 |
| CN | 109 231 934 A | 1/2019 |
| CN | 109320172 A | 2/2019 |
| EP | 2 468 696 A1 | 6/2012 |
| FR | 2 546 331 A1 | 11/1984 |
| FR | 2 849 440 A1 | 7/2004 |
| JP | 2005139010 A | * 6/2005 |
| WO | 01/028955 A1 | 4/2001 |

OTHER PUBLICATIONS

Erdogmus, E., "Combined effect of waste colemanite and silica fume on properties of cement mortar," Sci Eng Compos Mater, 2014, vol. 21, No. 3, pp. 369-375.
Olgun, A., et al., "Physico-chemical characteristics of chemically activated cement containing boron," Building and Environment, vol. 42, pp. 2384-2395, 2007.
Piotrowski, T. et al., "Influence of gadolinium oxide and ulexite on cement hydration and technical properties of mortars for neutron radiation shielding purposes," Construction and Building Materials, vol. 195, pp. 583-589, 2019.
Aug. 31, 2020 International Search Report issued in International Patent Application No. PCT/EP2020/066410.
Aug. 31, 2020 Written Opinion of the International Searching Authority issued in International Patent Application No. PCT/EP2020/066410.

* cited by examiner

*Primary Examiner* — Anthony J Green
(74) *Attorney, Agent, or Firm* — Oliff PLC

(57) ABSTRACT

A method for the kinetic regulation of cementitious binders and/or cementitious binder compositions, the method including the steps of providing a cementitious binder, admixing at least one borate mineral to said cementitious binder, and optionally admixing an activator selected from the group consisting of CaO, Ca(OH)$_2$, and/or CaSO$_4$.

10 Claims, 1 Drawing Sheet

METHOD FOR THE KINETIC REGULATION OF CEMENTITIOUS BINDERS

TECHNICAL FIELD

The invention belongs to a method for the kinetic regulation of cementitious binders or cementitious binder compositions, especially cementitious binder compositions comprising calcium aluminate and/or calcium sulphoaluminate cements.

BACKGROUND OF THE INVENTION

It has long been known that the setting of cementitious binder compositions, for example compositions based on Ordinary Portland Cement (OPC), can be retarded by different inorganic as well as organic materials. Set retarders prolong the setting time and increase the open time of a cementitious binder composition thus enabling longer workability which is useful e.g. for transport, mixing, pumping, placing, compacting or shaping. Set retarders known in the prior art include sugars and sugar-like materials (e.g. gluconate), lignosulfonates, citric acid, tartaric acid, phosphonates, and/or boric acid and its salts.

Typically, set-retarders prolong the open time and at the same time delay the curing reaction of cementitious binder compositions and thus delay the development of compressive strength at early age. A set-retarder useful for practical applications should prolong the open time while not delaying the curing reaction to a large extend. Boric acid and borax have been proven to be particularly useful in this context.

Such set retardation is particularly important when cementitious binder compositions are processed and/or placed in elevated temperature conditions such as for example in oil well cementing operations. U.S. Pat. No. 2,006,426 discloses the use of boric acid $B(OH)_3$ and sodium borate $Na_2B_4O_7$ (borax) in a set-retarding admixture for OPC-based slurries for oil well cementing.

Cements used in construction typically contain ordinary Portland cement (OPC) or are based on OPC clinker. However, during production of OPC high energy consumption is encountered for sintering and milling and thus a substantial amount of $CO_2$ is released per ton of cement. Efforts from cement producers to reduce $CO_2$ emissions include the use of alternatives to OPC which are based on clinker requiring less energy for production. One such alternative are calcium sulphoaluminate (CSA) cements. Typically, cementitious binder compositions comprising CSA cement show accelerated setting and curing. Furthermore, calcium aluminate (CAC) may be used to replace at least part of the OPC in a cementitious binder composition. The replacement of OPC by CAC typically also leads to accelerated setting and curing.

To ensure a workability long enough for practical application of cementitious binder compositions comprising CSA cement and/or CAC it is thus necessary to retard the setting. Boric acid and borax have been found to be suitable set-retarders also in these cases, especially because they retard the setting but have less influence on curing and thus development of compressive strength of cementitious binder compositions comprising CSA cement and/or CAC as compared to other set-retarders (M. Zajac et al. in Cement and Concrete Research, Vol. 84, 2016, 62-75.)

However, the use of boric acid or borax poses severe environment, health, and safety (EHS) problems as both may damage fertility or the unborn child.

Other borates, such as colemanite, have been used in the production of neutron-beam shielding concrete to scavange neutrons emitted for example by radioactive waste. For example, CN109320172 discloses a radiation-proof concrete comprising a calcium fluoroaluminate cement and 3-7 w %, based on the weight of the cement, of colemanite. However, no retarding effect of the colemanite is disclosed.

Finally, U.S. Pat. No. 9,868,674 discloses an additive comprising an alkanolamine borate, an organic alcohol, and a saccharide or derivative thereof. The additive is useful as set-retarder of CSA-modified OPC. However, such alkanolamine borates have to be prepared in an extra step and are not always well available.

There is thus a need for methods for the kinetic regulation of cementitious binders, particularly of cementitious binders comprising CAC and/or CSA cements, and which do not have the disadvantages mentioned above.

DESCRIPTION OF THE INVENTION

It is an object of the present invention to provide a method for the kinetic regulation of the setting and curing at early age of cementitious binder and/or cementitious binder compositions, especially of cementitious binder compositions comprising calcium aluminate (CAC) and/or calcium sulphoaluminate (CSA) cements. Said method essentially excluding the use of borax or boric acid.

It is another object of the present invention to provide cementitious binder compositions, especially cementitious binder compositions comprising CAC and/or CSA cements which comprise a set-retarder which is a borate mineral.

Surprisingly, it was found that a method according to claim 1 is suitable for efficient kinetic regulation of the setting and curing at early age of cementitious binders or cementitious binder compositions, especially of cementitious binder compositions comprising CAC and/or CSA cements.

An efficient kinetic regulation means within the context of the present invention that the setting of cementitious binders or cementitious binder compositions, especially of cementitious binder compositions comprising CAC and/or CSA cements, is retarded while the curing at early age of said cementitious binders or cementitious binder compositions proceeds fast enough for practical purposes.

It was further found that different borate minerals can be used in a method of the present invention. It was surprisingly found within the present invention that the specific surface area of a borate mineral can be adjusted so that efficient kinetic regulation of cementitious binders or cementitious binder compositions, especially of cementitious binder compositions comprising CAC and/or CSA cements, is achieved at low dosages of the respective borate mineral.

It was likewise found that the dosage of a borate mineral can be adjusted so that efficient kinetic regulation of cementitious binders or cementitious binder compositions, especially of cementitious binder compositions comprising CAC and/or CSA cements, is achieved at a given specific surface area of the respective borate mineral.

Further aspects of the invention are subject matter of further independent claims. Particularly preferred embodiments of the invention are subject matter of the dependent claims.

WAYS OF CARRYING OUT THE INVENTION

A "set retarder" or "retarder" within in the context of the present invention is an additive for cementitious binders and/or cementitious binder compositions, which delays the hydration reaction of said cementitious binders and/or cementitious binder compositions after the addition of mixing water as compared to a reference without any such additive. Particularly, a set retarder influences the hydration reaction at an early age in such a way that the induction period, or open time, of a cementitious binder and/or cementitious binder composition is increased. Set retarders are described in more detail in standard EN 934-2:2012-08, table 8. One advantage of using set retarders can be for example that they enable a longer transport time of mixed concrete to a job site.

The term "early age" pertains to the age of a cementitious binder or a cementitious binder composition shortly after the addition of mixing water. Preferably, early age in the context of the present invention, refers to a cementitious binder or a cementitious binder composition of not more than 48 h, preferably not more than 36 h of age after the addition of mixing water.

The term "setting" within the context of the present invention means the process of hydration of a cement or cementitious binder composition starting from the addition of mixing water. The setting is finalized once the cementitious binder composition has completely lost its plasticity and is sufficiently cured to attain the shape of the mould in which it is cast. A measure for the final setting time is the time elapsed from mixing of the cement or the cementitious binder composition with mixing water until the cumulative heat flow curve has reached a plateau.

The term "open time" or "induction period" within the context of the present invention means the time after addition of mixing water to a cement or cementitious binder composition and during which time the mixture has a workability which is not significantly changed from initial. A measure for the open time is the time elapsed from mixing of the cement or the cementitious binder composition with mixing water until the heat flow curve starts to increase for the first time.

The term "curing" within the context of the present invention means the process of hydration after setting is finished and continuing until the final compressive strength of the cementitious binder composition is obtained. The compressive strength of a cementitious binder composition will increase during cure. The compressive strength of a cementitious binder composition can be measured according to EN 12390-1 to 12390-4 on prisms of size 40×40×160 mm. Alternatively, the compressive strength can be calculated after calibration from the height of the plateau of a cumulative heat flow curve.

A "cumulative heat flow curve" within the context of the present invention is the time dependent measurement of heat released by the hydrating cementitious binder composition. The term "heat flow curve" within the context of the present invention relates to the first derivative of a cumulative heat flow curve. A heat flow curve can be measured in an isothermal process as described in standard ASTM C1702-17. For the present invention, heat flow curves were measured on an i-CAL 8000 from Calmetrix. Cumulative heat flow curves were calculated from heat flow curves by integration using software default parameters.

The term "clinker" as used in the context of the present invention refers to a material produced by sintering raw materials such as limestone, clay, sand, bauxite, fly ash, etc. in a kiln. The choice of raw materials and detailed sintering procedures depend on the type of clinker to be made. In the context of the present invention clinker may also be referred to as a hydraulic binder. Upon mixing with water, clinker reacts in the so-called hydration reaction to form first a cement paste and subsequently cures to form solid hydrates or hydrate phases.

A "cement" or "cementitious binder" as used in the context of the present invention refers to a material that comprises at least one clinker. A cement as referred to in the present invention preferably has a content of at least 5 w %, preferably of at least 15 w %, more preferably of at least 50 w %, especially of at least 80 w %, each based on the total dry weight of the cement, of at least one clinker. In one embodiment, the cement consists to an extent of at least 95 w %, based on the total dry weight of the cement, of a clinker.

A "cementitious binder composition" is thus a composition comprising at least one cementitious binder.

According to embodiments, a cementitious binder of the present invention comprises at least one calcium aluminate cement (CAC). A calcium aluminate cement (CAC) of the present invention is a cement comprising a clinker comprising hydraulic calcium aluminates, the main phase preferably being CA (C: CaO; A: $Al_2O_3$). Other calcium aluminates such as $CA_2$, $C_3A$, $C_{12}A_7$ typically are also present. CAC of the present invention typically also contain other phases selected from gehlenite ($C_2AS$ with C: CaO, A: $Al_2O_3$, S: $SiO_2$), perovskite (CT with C: CaO, T: $TiO_2$), belite ($C_2S$ with C: CaO, S: $SiO_2$), tricalcium silicate, ferrites ($C_2F$, $C_2AF$, $C_4AF$ with C: CaO; A: $Al_2O_3$; F: $Fe_2O_3$), ternesite ($C_5S_2\$$ with C: CaO, S: $SiO_2$; $: $SO_3$), and aluminumoxide. CAC of the present invention may further contain calcium carbonate. In particular, a CAC of the present invention is according to standard EN 14647. CAC which are described in other standards, for example ASTM or Chinese standards, are equally suitable. Suitable CAC can, for example, be commercially obtained from Kerneos SA or Royal White Cement.

According to further embodiments, a cementitious binder of the present invention comprises at least one calcium sulphoaluminate (CSA) cement. A CSA cement of the present invention is a cement comprising a clinker comprising $C_4(A_{3-x}F_x)\$$ (C: CaO; A: $Al_2O_3$; F: $Fe_2O_3$; $: $SO_3$) where x is an integer of from 0-3. CSA of the present invention typically comprise further phases selected from aluminates (CA, $C_3A$, $C_{12}A_7$ with C: CaO; A: $Al_2O_3$), belite ($C_2S$ with C: CaO, S: $SiO_2$), ferrites ($C_2F$, $C_2AF$, $C_4AF$, with C: CaO; A: $Al_2O_3$; F: $Fe_2O_3$), ternesite ($C_5S_2\$$ with C: CaO, S: $SiO_2$; $: $SO_3$) and anhydrite. According to certain embodiments CSA of the present invention contains 15-75 w % $C_4A_3\$$, 0-10 w % aluminates, 0-70 w % belite, 0-35 w % ferrites, 0-20 w % ternesite, and 0-20 w % anhydrite, each based on the total dry weight of the CSA cement. Suitable CSA can, for example, be commercially obtained from Heidelberg Cement AG, Buzzi Unicem or under the tradename Calumex from Caltra B.V.

According to still further embodiments, a cementitious binder of the present invention comprises at least one Ordinary Portland Cement (OPC) in addition to the at least one CAC and/or at least one CSA cement. OPC, within the context of the present invention can be any one cement composition CEM I to CEM V according to standard EN 197-1 or CEM VI. According to preferred embodiments, OPC is a cement of type CEM I and/or CEM II according to EN 197-1. Cements which are described in alternative standards, for example ASTM C150 and ASTM C595 are equally suitable.

In a preferred embodiment, a cementitious binder of the present invention comprises a mixture of OPC, CAC and/or CSA cement.

It is thus, for example, possible for the cementitious binder to essentially consist of at least one CAC. It is likewise possible for the cementitious binder to essentially consist of at least one CSA cement. It is further possible for the cementitious binder to essentially consist of a mix of at least one OPC with at least one CAC and/or at least one CSA cement.

According to embodiments the cementitious binder additionally comprises up to w %, preferably up to 35 w %, especially up to 20 w %, each based on the total dry weight of the cement, of a calcium sulfate. The calcium sulfate may be present in the form of calcium sulfate-hemihydrate, calcium sulfate-dihydrate and/or anhydrite. The calcium sulfate may form part of the clinker.

It is possible, and in certain cases also preferred, that the cementitious binder further comprises one or more latent hydraulic binders, pozzolanic binders and/or nonhydraulic binders. Suitable latent hydraulic binders, pozzolanic binders and/or nonhydraulic binders are for example, natural pozzolanes, slag, fly ash, silica dust, burned slate, quicklime and/or limestone. According to embodiments, a cement of the present invention comprises 0-95 w %, preferably 5-80 w %, more preferably 5-70 w %, still more preferably 10-50 w %, especially 10-20 w %, each based on the total dry weight of the cement, of latent hydraulic binders, pozzolanic binders and/or nonhydraulic binders.

A cementitious binder may additionally comprise inert fillers. Inert fillers are inorganic materials which do not take part in the hydraulic reaction. Typical inert fillers are finely grinded aggregates and/or recycled concrete material.

Finally, a cementitious binder of the present invention may additionally comprise cement improvers chosen from the group consisting of grinding aids, strength improvers, activators, accelerators, retarders, air entrainers, plasticizers and superplasticizers. Cement improvers may be interground with the clinker during milling. They may likewise be admixed to the milled clinker.

It is thus, for example, possible for the cementitious binder to comprise at least one CAC or at least one CSA cement or a mix of at least one OPC with at least one CAC and/or at least one CSA cement, and additionally to comprise one or more of calcium sulfate, latent hydraulic binders, pozzolanic binders and/or nonhydraulic binders, inert fillers, and cement improvers.

In a first aspect, the present invention provides a method for the kinetic regulation of cementitious binders and/or cementitious binder compositions, especially cementitious binders and/or cementitious binder compositions comprising CAC and/or CSA cements, the method comprising the steps of 1) providing a cementitious binder, 2) providing at least one borate mineral, 3) mixing the cementitious binder and the at least one borate mineral in any given order, and 4) optionally admixing an activator selected from the group consisting of CaO, Ca(OH)$_2$, and/or CaSO$_4$, the method being characterized in that the dosage and/or the specific surface area of every borate mineral is chosen in a way that the product P of the dosage and the square root of the specific surface area of the respective borate mineral is from 0.01-75, preferably from 0.05-20, more preferably from 0.1-15, still more preferably from 0.1-10, particularly preferred from 0.1-5, especially from 0.1-3.5.

The product P of the dosage and the square root of the specific surface area of the at least one borate mineral is calculated according to the equation (I)

$$P = D \cdot (SSA)^{1/2} \qquad (I)$$

with D=dosage of the borate mineral in w % relative to the cementitious binder and with SSA=specific surface area of the borate mineral in m$^2$/g.

If two or more borate minerals are used in a method of the present invention the dosage and/or the specific surface area of every single borate mineral has to be chosen in a way that the product P of the dosage and the square root of the specific surface area of that specific single borate mineral is within the above ranges. This means for example, that if two different borate minerals are used in a method of the present invention, the product $P_1 = D_1 \cdot (SSA_1)^{1/2}$ for the first borate mineral 1 must be within the above ranges and the product $P2 = D_2 \cdot (SSA_2)^{1/2}$ for the second borate mineral 2 must also be within the above ranges.

A different borate mineral, within the context of the present invention, can be a borate mineral of different chemical composition. A different borate mineral can likewise be a borate mineral of the same chemical composition but with a different specific surface area.

The term "specific surface area" refers for the present purpose to the total surface area per unit of mass of a solid material. It is also referred to as the BET-surface as it is measured by adsorption of nitrogen using the BET isotherm. The surface area is given in m$^2$/g. The specific surface area can be measured according to standard ISO 9277.

The cementitious binder of the present invention is as described above.

According to embodiments, the cementitious binder comprises or essentially consists of at least one CAC and/or at least one CSA cement as described above.

According to further embodiments the cementitious binder additionally comprises at least one OPC as described above.

If at least one OPC is comprised in a mineral binder of the present invention, the weight ratio of said at least one OPC to the at least one CAC and/or CSA cement is 200:1-1:1000, preferably 200:1-1:200, more preferably 150:1-1:150, still more preferably 100:1-1:100, particularly preferred 10:1-1:100, especially 5:1-1:50.

According to particularly preferred embodiments, the cementitious binder comprises the at least one OPC, the at least one CAC, and/or the at least one CSA cement in an amount of at least 25 w %, preferably of at least 50 w %, more preferably of at least 80 w %, each based on the total dry weight of the cementitious binder. However, smaller amounts may also be possible.

In one embodiment, the cementitious binder consists to an extent of at least 95 w %, based on the total weight of the cementitious binder, of at least one OPC, at least one CAC, and/or at least one CSA cement, preferably of at least one CAC and/or CSA cement.

According to embodiments, and as described above, the cementitious binder additionally comprises calcium sulfate, one or more latent hydraulic binders, pozzolanic binders and/or nonhydraulic binders, inert fillers, and/or cement improvers chosen from the group consisting of grinding aids, strength improvers, activators, accelerators, retarders, air entrainers, plasticizers and superplasticizers.

A borate mineral to be used in a method of the present invention is an oxide of boron. Typically, such oxides are negatively charged and have counter ions selected from the group consisting of alkali metals and/or alkaline earth metals.

The term borate or borate mineral, within the present context, also encompasses metaborates. Other counter ions, such as ammonium ions, aluminum, titanium, iron, copper or zinc may likewise be possible. Boron oxides, within the context of the present invention, may contain within their structure further metal or half-metal atoms, in particular aluminum and/or silicon. Boron oxides can be condensed to form oligoborates. A detailed description of chemical composition and structure of boron oxides can be found in N. Wiberg: "Holleman-Wiberg Lehrbuch der anorganischen Chemie", Walter de Gruyter publishers, 101. Edition, 1995, pages 1038-1040.

According to embodiments, the at least one borate mineral is of synthetic origin. Suitable synthetic methods for the production of borate minerals include hydrothermal processes, thermal processes such as calcination and/or precipitation. Preferably, alkali and/or alkaline earth metal borates and/or metaborates of synthetic origin are used with the exclusion of boric acid and its salts, and with the exclusion of borax. Particularly preferred synthetic borate minerals are for example magnesium borates or calcium borates, especially mono-, di- or triborates of magnesium or calcium as well as their hydrates, or calcium metaborate.

According to embodiments, the at least one borate mineral is of natural origin. According to preferred embodiments, the at least one borate mineral is selected from the group consisting of monoborates, diborates, triborates, tetraborates, pentaborates, hexaborates, heptaborates and/or polyborates of natural origin. Boric acid, including the minerals sassolite and sibirskite, and borax, including the mineral tincal, are excluded.

Within the present context the term "at least one borate mineral" thus relates to alkali and/or alkaline earth metal borates and/or metaborates of synthetic origin and monoborates, diborates, triborates, tetraborates, pentaborates, hexaborates, heptaborates and/or polyborates of natural origin with the exclusion of boric acid, borax, sassolite, sibirskite, and tincal.

It is preferred, within the context of the present invention, that the at least one borate mineral is of natural origin.

According to embodiments, the at least one borate mineral is selected from the group consisting of calcium borate, calcium metaborate, takedaite, kotoite, frolovite, hexahydroborite, suanite, sussexite, szaibelyite, wiserite, pinnoite, pentahydroborite, calciborite, meyerhofferite, inyoite, colemanite, hydroboracite, howlite, jarandolite, johachidolite, kernite, sborgite, ulexite, larderellite, probertite, tertschite, nasinite, gowerite, tuzlaite, hilgardite, aksaite, admontite, kaliborite, fabianite, and/or nobleite. Mixtures of two or more of the preferred borate minerals are possible.

Especially preferred borate minerals for use in a method of the present invention are calcium borate, calcium metaborate, meyerhofferite, colemanite, and/or ulexite, most preferred are calcium metaborate, colemanite and/or ulexite.

The at least one borate mineral used within the context of the present invention may comprise other minerals commonly formed by evaporative processes such as, for example, calcite, dolomite, silicates or clay. One example for a borate mineral comprising other minerals is hectorite another example is gerstley borate. It is further possible that the at least one borate mineral comprises said other minerals, especially calcite, dolomite and/or clay as impurities. Calcite, dolomite and/or clay as impurities may be comprised in the at least one borate mineral in not more than 25 w %, preferably not more than 20 w %, more preferably not more than 15 w %, especially not more than 10 w %, each based on the total weight of the at least one borate mineral.

The use of boric acid or borax is excluded in a method of the present invention. This means that the total amount of boric acid or borax in a method of the present invention is <1 w %, preferably <0.25 w %, more preferably <0.1 w %, still more preferably <0.05 w %, especially <0.01 w %, each based on the total dry weight of the cementitious binder.

According to especially preferred embodiments, the at least one borate mineral is a solid, especially a solid in powder form. Such powdered borate minerals can be characterized by their particle size and their specific surface area.

The particle size can e.g. be determined by laser diffraction as described in ISO 13320:2009. In particular, a Helos instrument with a Quixel dispersing unit and the software Windox 5.9 from Sympatec GmbH (Germany) can be used for this purpose. Preferably, a particle size of non-spherical or irregular particles is represented by the equivalent spherical diameter of a sphere of equivalent volume. The particle size is usually measured as a particle size distribution and different D values are used to describe such particle size distribution. A D50 value, for example, represents the particle size where 50% of the particle have a lower particle size and 50% have a larger particle size.

In the following, the lower values of the ranges given for the particle size represent D1 values whereas the upper values of the ranges given for the particle size represent D99 values. Put differently, in this case, 1% of the particles have a lower particle size than the lower value of a range, whereas 1% of the particles have a larger particle size than the upper value of a range.

According to embodiments, the particle size of the at least one borate mineral used in a method of the present invention is between 0.01-200 µm, preferably 0.1-200 µm, more preferably 0.2-180 µm, especially 0.5-135 µm. According to embodiments, the D50 value is <100 µm, preferably <75 µm. The D50 value is the particle size where 50% of the particles are bigger and 50% are smaller.

The specific surface area or BET-surface can be measured as described above.

According to embodiments, the specific surface area of the at least one borate mineral used in a method of the present invention is between 0.1-200 $m^2/g$, preferably 0.2-150 $m^2/g$, more preferably 0.3-100 $m^2/g$, especially 0.5-50 $m^2/g$.

Solid borate minerals with a particle size and a specific surface area as described above can be commercially obtained and used in a method of the present invention without further modification. It is, however, also possible to further modify the said borate minerals prior to use in a method of the present invention.

According to embodiments, the at least one borate mineral to be used in a method of the present invention are thus dried prior to use. Drying is for example possible at temperatures between 35-150° C. preferably 50-100° C., optionally under reduced pressure. However, other drying procedures are possible as well, such as for example freeze-drying or supercritical drying. Preferably drying is carried out until the water content of a borate mineral to be used in a method of the present invention, but not including crystal water, is <1 w %, preferably <0.25 w %, especially <0.1 w %, each based on the total weight of the borate mineral including crystal water.

According to embodiments, the at least one borate mineral is treated to reduce dust formation prior to use. Such treatment may include encapsulation of the at least one borate mineral, preferably encapsulation in a water soluble shell such as, for example, a shell of polyvinylalcohol. Such treatment may likewise include pelletization of the at least one borate mineral. Finally, such treatment may include the mixing of the at least one borate mineral with a dust binder, for example silicone oil, mineral oil or vegetable oil, prior to use in a method of the present invention.

According to further embodiments, the at least one borate mineral to be used in a method of the present invention is ground prior to use. Grinding can be done in any process known to the person skilled in the art. It can, for example, be done by hand, using a mortar and pestle, by a crusher or by a mill, for example a ball mill, a rod mill, a rotating drum mill, a pebble mill, a hammer mill or a roller mill.

Grinding of the at least one borate mineral to be used in a method of the present invention is especially necessary if the at least one borate mineral commercially obtained has a particle size D50 >100 µm and/or a specific surface area <0.1 $m^2/g$.

It has been found that borate minerals are especially effective in retarding the setting of a cementitious binder composition in a method of the present invention if they have been ground prior to use.

Without wishing to be bound by theory, it is believed that the freshly exposed surfaces resulting from such grinding are especially reactive towards other components of the cementitious binder composition.

It is therefore especially preferred, that a method of the present invention involves a grinding step for the at least one borate mineral.

According to an especially preferred embodiment, the at least one borate mineral is ground in-situ. In-situ grinding, within the context of the present invention, describes the grinding of particles of the at least one borate mineral of a given size to particles of a smaller size and/or with freshly exposed surfaces in the presence of the cementitious binder as described above.

According to embodiments, in-situ grinding is done during milling of cement for example in a ball mill or roller mill. According to further embodiments, in-situ grinding is done by the mechanical and/or chemical action of components of the cementitious binder and/or aggregates, for example in a concrete mixer.

It is possible, and in certain cases also preferred, to add cement improvers as described above during the in-situ grinding of the at least one borate mineral.

According to embodiments, the at least one borate mineral is in the form of a suspension or slurry, preferably a suspension or slurry in water. The solid content in such a suspension or slurry is at least 0.5 w %, preferably at least 1 w %, more preferably at least 5 w %, especially at least 10 w %, each based on the total weight of the suspension or slurry. The suspension or slurry may comprise additional stabilizers. Stabilizers are, for example, thickeners, anti-settling agents, pH buffers, and/or biocides.

The suspension and or slurry of the at least one borate mineral may take the form of a liquid or of a paste.

The at least one borate mineral is admixed to the cementitious binder in a method of the present invention. Admixing is possible by any process known to the person skilled in the art. Admixing is possible in a batch process, a semi-continuous process or a continuous process. The conditions during the admixing, especially temperature, time, and mixing energy, are not particularly restricted and can vary in wide ranges.

It is for example possible to admix the at least one borate mineral to the cementitious binder at low temperature such as for example 5° C., 0° C., or −10° C. It is likewise possible to admix the at least one borate mineral to the cementitious binder at moderate temperature such as for example 10° C., 15° C., or 25° C. It is also possible to admix the at least one borate mineral to the cementitious binder at elevated temperature such as for example 35° C., 50° C., or higher.

It is for example possible to admix the at least one borate mineral to the cementitious binder in a fast process, for example within 1 second, 10 seconds or 1 minute. It is likewise possible to admix the at least one borate mineral to the cementitious binder in a slower process for example within 5 minutes, 15 minutes, 30 minutes, or longer. It is also possible that the mixing takes several days.

According to embodiments, the at least one borate mineral is admixed to the cementitious binder in a method of the present invention in a mill, preferably in a cement mill, especially in a ball mill or a vertical roller mill, in a horizontal single shaft mixer, twin shaft paddle mixer, vertical shaft mixer, ribbon blender, orbiting mixer, change-can mixer, tumbling vessel, vertical agitated chamber, air agitated operation, hobart mixer, portable concrete mixer, mixing truck, mixing bucket, paddle mixer, jet mixer, screw mixer, screw-extruder, or auger mixer.

It is not possible, within the scope of the present invention, to admix the at least one borate mineral with other constituents of the cement clinker prior to the clinker production in a kiln. In other words, the at least one borate mineral may, within the scope of the present invention, only be admixed to finished clinker after the clinkering has occurred in a kiln. It is, however, possible within the scope of the present invention to admix the at least one borate mineral to a cementitious binder prior to or during milling of the clinker as described above.

It is furthermore possible for the at least one borate mineral according to the present invention to be admixed together with other constituents of the cementitious binder or the cementitious binder composition. It is, for example, possible for the at least one borate mineral according to the present invention to be admixed together with any one of the latent hydraulic binders, pozzolanic binders, nonhydraulic binders, inert fillers, and/or a sulfate carrier such as e.g. calcium sulfate which can be comprised in a cementitious binder as discussed above. It is likewise possible for the at least one borate mineral according to the present invention to be admixed together with an aggregate and/or additive.

According to embodiments, the dosage of the at least one borate mineral is chosen according to its surface area such that the product P of the dosage and the square root of the surface area of said at least one borate mineral is from 0.01-75, preferably from 0.05-20, more preferably from 0.1-15, still more preferably from 0.1-10, particularly preferred from 0.1-5, especially from 0.1-3.5 as described above.

According to other embodiments, the specific surface area of the at least one borate mineral is chosen according to its dosage such that the product P of the dosage and the square root of the surface area of said at least one borate mineral is from 0.01-75, preferably from 0.05-20, more preferably from 0.1-15, still more preferably from 0.1-10, particularly preferred from 0.1-5, especially from 0.1-3.5 as described above.

The product P is equal or higher than 0.01, preferably equal or higher than 0.05, more preferably equal or higher than 0.1, as otherwise the set-retarding effect of a borate mineral in a method of the present invention is too low. This means that the open time and/or the final setting time of a mineral binder composition comprising a borate mineral with said product P is not significantly longer than the open time of a mineral binder composition without any borate mineral admixed. According to embodiments, the at least one borate mineral is used in a method of the present invention in an amount of 0.01-10 wt.-%, preferably 0.1-7 wt.-%, more preferably 0.1-3 wt.-%, especially 0.2-2.0 wt.-%, in each case relative to the total dry weight of the cementitious binder.

The present invention thus also pertains to a method for the kinetic regulation of cementitious binders and/or cementitious binder compositions, the method comprising the steps of 1) providing a cementitious binder,
2) providing at least one borate mineral,
3) mixing the cementitious binder and the at least one borate mineral in any given order, and
4) optionally admixing an activator selected from the group consisting of CaO, Ca(OH)$_2$, and/or CaSO$_4$, the method being characterized in that the dosage of the at least one borate mineral is from 0.01-10 wt.-%, preferably 0.1-7 wt.-%, more preferably 0.1-3 wt.-%, especially 0.2-2.0 wt.-%, in each case relative to the total dry weight of the cementitious binder.

An activator selected from the group consisting of CaO, Ca(OH)$_2$ and/or CaSO$_4$ optionally is admixed in a method of the present invention. The activator has the effect that upon admixing the activator to a cementitious binder composition comprising water, the setting and curing reaction starts immediately. The activator is thus used to offset the retarding effect of the at least one borate mineral of the present invention.

The CaSO$_4$ may be present in the form of calcium sulfate-hemihydrate, calcium sulfate-dihydrate and/or anhydrite.

According to one embodiment, the activator is admixed in form of a solid, especially in form of a powder, to a dry cementitious binder composition of the present invention. The solid activator is admixed with a dosage of 0.1-5 w %, preferably of 0.5-3 w % or of 0.5-2 w %, each based on the total weight of the cementitious binder. Admixing can be done by a process as described above.

According to another embodiment, the activator is admixed in form of a suspension or slurry, preferably an aqueous suspension or slurry. The solid content in such a suspension or slurry is at least 0.5 w %, preferably at least 1 w %, more preferably at least 10 w %, each based on the total weight of the suspension or slurry. The suspension or slurry may comprise surfactants and/or additional stabilizers. Stabilizers are, for example, thickeners, anti-settling agents, pH buffers, and/or biocides. The suspension and or slurry of the activator may take the form of a liquid or of a paste. The suspension is admixed in a dosage of 0.1-5 w %, preferably of 0.5-3 w % or of 0.5-2 w % of solids relative to the total weight of the cementitious binder.

A particularly preferred method of the present invention thus comprises the steps of 1) providing a cementitious binder comprising
   a) at least one CAC and/or CSA,
   b) optionally at least one OPC,
   c) optionally one or more of calcium sulfate, latent hydraulic binders, pozzolanic binders, nonhydraulic binders, inert fillers, and/or cement improvers, and
2) optionally drying at least one borate mineral,
3) providing at least one borate mineral, preferably colemanite and/or ulexite, characterized in that the dosage and/or the specific surface area of every borate mineral is chosen in a way that the product P of the dosage and the square root of the specific surface area of the respective borate mineral is from 0.01-75, preferably from 0.05-20, more preferably from 0.1-15, still more preferably from 0.1-10, particularly preferred from 0.1-5, especially from 0.1-3.5, and
4) optionally grinding the at least one borate mineral, preferably grinding the at least one borate mineral in-situ,
5) mixing the cementitious binder and the at least one borate mineral, and
6) optionally admixing at least one activator selected from the group consisting of CaO, Ca(OH)$_2$, and/or CaSO$_4$.

According to one particularly preferred embodiment, a method of the present invention thus essentially consists of the steps 1), 3), and 5) or of steps 1), 3), 4), and 5) as defined above. Such a method leads to a particular efficient kinetic regulation.

According to another preferred embodiment, a method of the present invention thus essentially consists of the steps 1), 3), 5), and 6) or of the steps 1), 3), 4), 5), and 6) as defined above. Such a method allows for the reactivation of a retarded cementitious binder composition.

According to embodiments, a method of the present invention may comprise further steps. Such further steps can be for example the addition of aggregates, additives and/or the addition of water.

Such further steps may additionally be the storage and/or transportation of a cementitious binder or cementitious binder composition, optionally further mixed with aggregate and/or additives, either in dry form or in a pasty or liquid form after mixing with water. Storage in dry form is particularly preferred.

The addition of aggregates, additives, and/or water in any further steps of a method of the present invention is possible in mixing devices as described above. The mixing can be done either in a factory, to provide for example cements, dry mix mortars or ready-mix concrete, or at a job site.

The water to be used in a cementitious binder composition of the present invention can be any water available at the site of mixing such as distilled water, purified water, tap water, mineral water, spring water, well water, waste water, or salt water. Water is added in a ratio of water/cementitious binder of 0.05-2.0, preferably 0.1-1.0, more preferably 0.15-0.8, especially 0.2-0.7.

According to embodiments, a method of the present invention may further comprise a step of placing and curing a cementitious binder composition mixed with water.

A method of the present invention may thus comprise the steps of 1) providing a cementitious binder comprising
   a) at least one CAC and/or CSA,
   b) optionally at least one OPC,
   c) optionally one or more of calcium sulfate, latent hydraulic binders, pozzolanic binders, nonhydraulic binders, inert fillers, and/or cement improvers,
2) optionally drying at least one borate mineral,
3) providing at least one borate mineral, preferably colemanite and/or ulexite, characterized in that the dosage and/or the specific surface area of every borate mineral is chosen in a way that the product P of the dosage and the square root of the specific surface area of the respective borate mineral is from 0.01-75, preferably from 0.05-20, more preferably from 0.1-15, still more preferably from 0.1-10, particularly preferred from 0.1-5, especially from 0.1-3.5, and 4) optionally grinding the at least one borate mineral, preferably grinding the at least one borate mineral in-situ,
5) mixing the cementitious binder and the at least one borate mineral,
6) optionally admixing aggregate,
7) optionally admixing other additives,
8) optionally admixing water,
9) optionally admixing an activator, to produce a cementitious binder composition, and
10) optionally storing the cementitious binder composition,
11) optionally transporting the cementitious binder composition,
12) optionally placing the cementitious binder composition,
13) optionally curing the cementitious binder composition.

It is especially preferred for a method of the present invention to be practiced at temperatures between −10° C.-50° C., preferably −5° C.-40° C., especially 0° C.-30° C.

According to an embodiment, the placing of a cementitious binder composition of the present invention is done on a construction site. According to another embodiment, the placing is done in a factory, especially a factory for pre-cast elements. According to yet another embodiment, the placing is done by spray concreting.

According to embodiments, the placing is done into a formwork which can have virtually any shape. According to other embodiments, the placing can also be done without a formwork, for example in a process of additive manufacturing. According to embodiments, the placing can be done batchwise, semi-continuously or continuously.

It is a further aspect of the present invention to provide a cementitious binder composition comprising
1) not more than 99.99 w %, preferably not more than 99.5 w %, more preferably not more than 99 w %, still more preferably not more than 95 w %, most preferred not more than 90 w %, especially not more than 85 w %, each based on the total weight of the dry cementitious composition, of a cementitious binder as described above,
2) at least one borate mineral as described above, wherein the at least one borate mineral does not form part of the clinker and wherein the dosage and/or the specific surface area of every borate mineral is chosen in a way that the product P of the dosage and the square root of the specific surface area of the respective borate mineral is from 0.01-75, preferably from 0.05-20, more preferably from 0.1-15, still more preferably from 0.1-10, particularly preferred from 0.1-5, especially from 0.1-3.5.

According to embodiments, the cementitious binder composition of the present composition may further comprise
3) not more than 95 w % of aggregate,
4) not more than 15 w % of at least one additive selected from the group consisting of plasticizers, superplasticizers, shrinkage reducers, air entrainers, deaerating agents, stabilizers, viscosity modifiers, water reducers, accelerators, retarders, water resisting agents, strength enhancing additives, fibres, blowing agents, pigments and steel passivating agents,
each based on the total dry weight of the cementitious binder composition.

The cementitious binder composition may take the form of a dry powder or a liquid or a paste mixed up with mixing water.

The water can be as defined above.

Aggregates or fillers, within the meaning of the present invention, can be any material that is non-reactive in the hydration reaction of clinkers. Aggregates can be any aggregate typically used for cementitious binders. Typical aggregates are for example rock, crushed stone, gravel, slag, sand, quartz sand, recycled concrete, limestone powder, glass, perlite or vermiculite. Aggregates useful for the present invention can have any shape and size typically encountered for such aggregates. Typically, mixtures of two or more different aggregates are used. Mixtures can be mixtures of aggregates of different chemical composition and/or mixture of aggregates with the same chemical composition but different particle size. Aggregates, useful for the present invention, are as described in EN 12620:2008-07 and EN13139:2015-07.

According to embodiments, aggregates can be present in a cementitious binder composition of the present invention in an amount of not more than 98 w %, preferably not more than 95 w %, especially not more than 90 w %, each based on the total dry weight of the cementitious binder composition According to embodiments, additives selected from the group consisting of plasticizers and/or superplasticizers, shrinkage reducers, air entrainers and/or deaerating agents, stabilizers, viscosity modifiers, water reducers, accelerators, retarders, water resisting agents, strength enhancing additives, fibres, blowing agents, pigments, and corrosion inhibitors can be present in a cementitious binder composition of the present invention.

According to embodiments, two or more of the above mentioned additives can be present in a cementitious binder composition of the present invention.

According to particularly preferred embodiments, a superplasticizer is present in a cementitious binder composition of the present invention. Superplasticizers can be any known to the person skilled in the art. Particular suitable superplasticizers can be polycarboxylic ethers (PCE). Polycarboxylic ethers are comb polymers with a polycarboxylic backbone and polyalkyleneoxide side-chains. Such polycarboxylic ethers are for example described in EP 2 468 696 (Sika Technology AG).

Superplasticizers, in particular polycarboxylic ethers, can be added to a cementitious binder composition of the present invention in not more than 10 w %, preferably not more than 7.5 w %, especially not more than 2.5 w %, calculated as dry weight of superplasticizer, based on the total weight of the cement contained.

Other suitable superplasticizers include lignosulphonates, polynaphthalene sulphonates, polyamine sulphonates, vinyl copolymers and polyethyleneoxide phosphonates. It can be preferred to add a mixture of different superplasticizers to a cementitious binder composition of the present invention.

According to further embodiments, an accelerator is present in a cementitious binder composition of the present invention which is selected from the group consisting of aminoalcohols, alkali or alkaline earth metal nitrates, alkali or alkaline earth metal nitrites, alkali or alkaline earth metal thiocyanates, alkali or alkaline earth metal halogenides, glycerine, derivatives of glycerine, aluminum sulfate, aluminum hydroxide, alkali or alkaline earth metal hydroxides, alkali or alkaline earth metal silicates, especially calcium silicate hydrates, alkali or alkaline earth metal oxides, alkali or alkaline earth metal salts of formic acid, or mixtures thereof.

According to still further embodiments, a retarder is present in a cementitious binder composition of the present invention which is selected from the group consisting of sugar acids, sugars, sugar alcohols, hydroxycarboxylic acids or their salts, phosphates, phosphonates, and amines.

According to embodiments, additives are present in a cementitious binder composition of the present invention in a total amount of not more than 10 w %, preferably not more than 5 w %, each based on the total weight of the cementitious binder composition.

According to embodiments, a cementitious binder composition of the present invention can be prepared by mixing the ingredients for example in a horizontal single shaft mixer, twin shaft paddle mixer, vertical shaft mixer, ribbon blender, orbiting mixer, change-can mixer, tumbling vessel, vertical agitated chamber, air agitated operation, hobart mixer, portable concrete mixer, mixing truck, mixing bucket, paddle mixer, jet mixer, screw mixer, screw-extruder, or auger mixer.

Especially, the cementitious binder composition of the present invention is not a radiation shielding concrete.

It is a last aspect of the present invention to provide a shaped body obtained by curing a cementitious binder composition obtained by a method as described above. The shaped body can be part of a building or infrastructure, such as for example a road, bridge, runway, wall, house, masonry stone, etc. Especially, the shaped body of the present invention is not a radiation shielding concrete. The following working examples illustrate the invention. The examples are not intended to limit the scope of the invention in any way.

WORKING EXAMPLES

Figure 1:
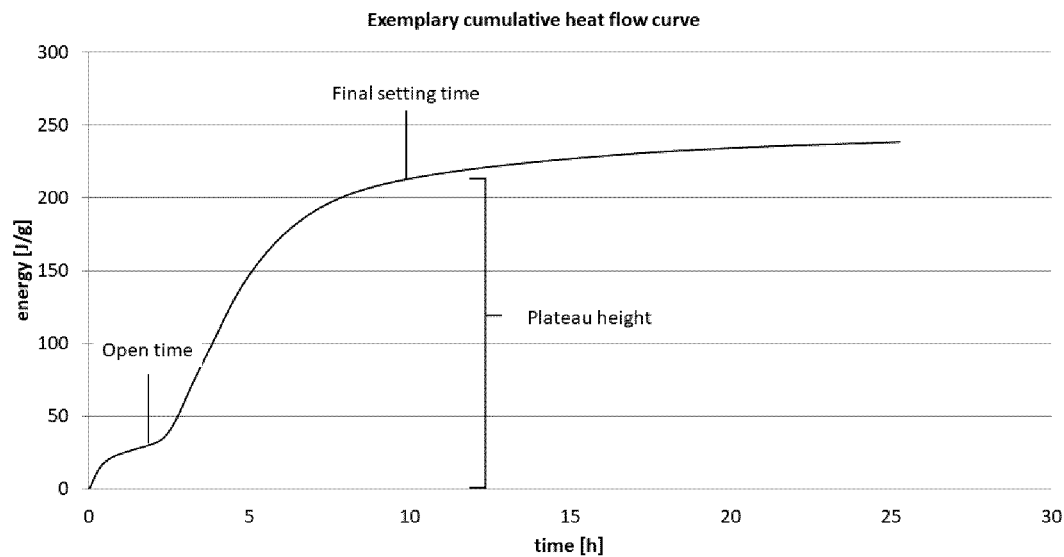
FIG. 1 shows an exemplary cumulative heat flow curve. The open time, final setting time, and plateau height are marked.
Figure 2:
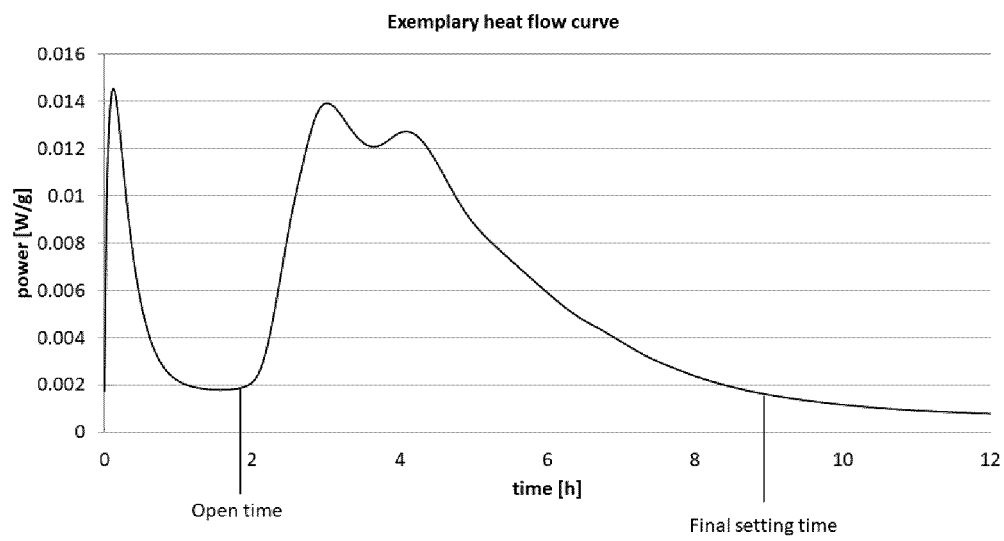
FIG. 2 shows an exemplary heat flow curve. The open time and final setting time are marked.

Heat flow curves were measured in an isothermal process as described in standard ASTM C1702-17. Examples were measured using an instrument i-CAL 8000 from Calmetrix. Cumulative heat flow curves were calculated from heat flow curves by integration using software default parameters.

The open time is the time at the point of inflection of the cumulative heat flow curve. It was measured on the heat flow curve as the time where the heat flow curve starts to increase. The final setting time was derived from the heat flow curve as the time when the increase in energy measured per 1 min becomes less than 0.1 J/g.

The plateau height is the total energy released from the time of mixing with mixing water until the final setting time is reached.

BET surfaces were determined in accordance with standard ISO 9277 by the adsorption of nitrogen. The measurement was done as a three point measurement at −196° C. using a Horiba SA-9600 instrument with Helium as a carrier gas. Samples were dried at 70° C. for 5 days prior to measurement.

The following Table 1 gives an overview of borate minerals used. All chemicals were used as supplied unless otherwise noted.

TABLE 1

Borate minerals used

| Borate mineral | Purity | Specific surface area [$m^2$/g] | Particle size D1-D99 [µm] |
| --- | --- | --- | --- |
| boric acid | 99.5% | n.r. | n.r. |
| calcium borate | >98% | 11.5 | 0.6-69 |
| ulexite | 89% | 2.6 | 0.7-130 |
| colemanite | 80% | 1 | 0.5-113 |
| gerstley borate* | 26.8% $B_2O_3$ | 2.4 | 0.6-87 |

*Gerstley borate used from US Borax Inc
n.r.: not relevant

The following Tables 2a to 2c give an overview of the various cementitious binders used. All cements were used as supplied.

TABLE 2a

Commercial cementitious binders used

| Cement | Type | Supplier |
| --- | --- | --- |
| Alpenat | CSA cement | Vicat SA |
| Alicem | CSA cement | Heidelberg Zement AG |
| Isidac 40 | CAC | Cimsa Cimento AS |

TABLE 2b

BYF cement composition (XRD, Rietveld refinement)

| Phase | wt % |
| --- | --- |
| Ye'elimite | 29 ± 2 |
| Belite | 46 ± 3 |
| Ferrite | 4 ± 1 |
| Calcium sulfate | 6 ± 1 |
| Others | 15 ± 2 |

TABLE 2c

Ternary blend composition

| | | Supplier |
| --- | --- | --- |
| Ternal white | 60 w % | Imerys |
| CEM I 52.5R | 25 w % | Heidelberg Zement AG |
| $CaSO_4$ (alpha-hemihydrate) | 15 w % | Casea |

Examples E1-E19

The respective cementitious binder and the respective borate mineral as indicated in below tables 3-5 were mixed in dosages as indicated in below tables 3-5 in a dry state by vigorously shaking the powders until visually homogeneous. Then water was added in an amount to realize a water/cement ratio of 0.5. Mixing was then continued on a Heidolph propeller mixer for 1 min at 1000 rpm. All mixing procedures were done at 23° C. and 50% r.h.

The following table 3 shows mixes and results with the cementitious binder BYF.

TABLE 3

Retardation of BYF cement with various borate minerals

| | Borate mineral | Borate mineral dosage ** | P | Open time [min] | Final setting time [h] | Plateau height [J/g] |
|---|---|---|---|---|---|---|
| C-1* | None (ref.) | 0 | n.r. | 72 | 27.6 | 214 |
| C-2* | None (boric acid) | 0.2 | n.r. | 168 | 28.2 | 222 |
| E-1 | ulexite | 0.5 | 0.8 | 190 | 24.2 | 208 |
| E-2 | ulexite | 1.0 | 1.6 | 448 | 28.6 | 196 |
| E-3 | colemanite | 1.0 | 1 | 126 | 25.3 | 200 |
| E-4 | colemanite | 2.0 | 2 | 194 | 32.4 | 205 |
| E-5 | calcium borate | 1.0 | 3.4 | 958 | 45.5 | 204 |
| E-6 | gerstley borate | 1.0 | 1.6 | 221 | 29.6 | 192 |
| E-7 | gerstley borate | 2.0 | 3.1 | 331 | 35.8 | 201 |
| E-8 | gerstley borate | 3.0 | 4.7 | 550 | 40.3 | 207 |

*comparative example not according to the invention
** in w % based on cementitious binder
$P = D \cdot (SSA)^{1/2}$ (product of dosage and square root of the specific surface area of the borate mineral)
n.r.: not relevant
n.m.: not measured The following table 4 shows mixes and results with the cementitious binder Alpenat.

TABLE 4

Retardation of Alpenat cement with various borate minerals

| | Borate mineral | Borate mineral dosage ** | P | Open time [min] | Final setting time [h] | Plateau height [J/g] |
|---|---|---|---|---|---|---|
| C-3* | None (ref.) | none | n.r. | 90 | 20.2 | 251 |
| E-9 | ulexite | 0.5 | 0.8 | 281 | 27.3 | 266 |
| E-10 | ulexite | 1 | 1.6 | 967 | 49.8 | 261 |
| E-10a | ulexite | 2 | 3.2 | 4440 | 105 | 241 |
| E-10b | ulexite | 7.5 | 12.1 | >10000 | n.m. | n.m. |
| E-11 | colemanite | 2 | 2.0 | 134 | 22.0 | 244 |
| E-12 | colemanite | 4 | 4.0 | 195 | n.m. | n.m. |
| E-12a | colemanite | 3.5 | 3.5 | 208 | 15.4 | 256 |
| E-13 | calcium borate | 1 | 3.4 | 1069 | 41.6 | 247 |
| E-13a | calcium borate | 2 | 6.8 | 2512 | 63.6 | 267 |
| E-13b | calcium borate | 7.5 | 25 | >10000 | n.m. | n.m. |
| E-14 | gerstley borate | 2 | 3.1 | 792 | 30.6 | 237 |

*comparative example not according to the invention
** in w % based on cementitious binder
$P = D \cdot (SSA)^{1/2}$ (product of dosage and square root of the specific surface area of the borate mineral)
n.r.: not relevant
n.m.: not measured The following table 5 shows mixes and results with the cementitious binders Isidac 40, Alicem, and the ternary blend.

TABLE 5

Retardation of cements Alicem, Isidac 40, and the ternary blend with various borate minerals

| | Cementitious binder/ Borate mineral | Borate mineral dosage ** | P | Open time [min] | Final setting time [h] | Plateau height [J/g] |
|---|---|---|---|---|---|---|
| C-4* | Alicem/ None (ref.) | 0 | n.r. | 30 | 19.8 | 273 |
| E-15 | Alicem/ calciumborate | 1.0 | 3.4 | 88 | 32.5 | 258 |
| E-16 | Alicem/ calciumborate | 2.0 | 6.8 | 607 | 40.4 | 241 |
| C-5* | Isidac 40/ None (ref.) | 0 | n.r. | 483 | 48.2 | 360 |
| E-17 | Isidac 40/ ulexite | 0.5 | 0.8 | 561 | 40.6 | 350 |
| C-6* | Ternary blend/ None (ref.) | 0 | n.r. | 0 | 18.5 | 270 |
| E-18 | Ternary blend/ calciumborate | 1.0 | 3.4 | 32 | 19.7 | 268 |
| | Ternary blend/ calciumborate | 2.0 | 6.8 | 1081 | 70.6 | 275 |
| | Ternary blend/ calciumborate | 3.5 | 11.9 | 12000 | 300 | 295 |
| | Ternary blend/ calciumborate | 7.5 | 25.5 | >18000 | n.m. | 91 |

*comparative example not according to the invention
** in w % based on cementitious binder
$P = D \cdot (SSA)^{1/2}$ (product of dosage and square root of the specific surface area of the borate mineral)
n.r.: not relevant
n.m.: not measured From the results presented in above Tables 3-5 it becomes clear that efficient set-retardation, expressed by prolonged open times, is achieved by a method of the present invention as compared to the references which are not prepared according to a method of the present invention and which do not comprise any borate minerals. The borate minerals used in a method of the present invention are even more efficient as compared to boric acid because they lead to a higher increase in open time but at the same time a lower increase in the final setting time.

It becomes further clear that a higher product P as defined by equation (I) above leads to a longer open time and normally also to a longer final setting time.

Examples E19-E20

BYF cement and ulexite (0.5 w % based on cement weight) were mixed in a dry state by vigorously shaking the powders until visually homogeneous. Water was added in an amount to realize a water/cement ratio of 0.5. Mixing was then continued on a Heidolph propeller mixer for 1 min at 1000 rpm. For examples E-19 and E-20, a suspension of $Ca(OH)_2$ and $CaSO_4$ hemihydrate (2:1 by weight, 25% solids content) was admixed on a Heidolph propeller mixer for 1 min at 1000 rpm. The suspension was added in 10 w % related to the cement weight after the time indicated in below table 6. All mixing procedures were done at 23° C. and 50% r.h.

TABLE 6

Kinetic regulation with ulexite and additional activator added

| | ulexite dosage ** | P | Time*** [min] | Open time [min] | Final setting time [h] | Plateau height [J/g] |
|---|---|---|---|---|---|---|
| E-19 | 0.5 | 0.8 | 1 | 1 | 14.6 | 154 |
| E-20 | 0.5 | 0.8 | 60 | 60 | 13.9 | 138 |

* comparative example not according to the invention
** in w % based on cementitious binder
***time elapsed after addition of water and until addition of activator
P = D · (SSA)$^{1/2}$ (product of dosage and square root of the specific surface area of the borate mineral)
n.r.: not relevant As can be seen from the above table 6, the addition of the activator to a cementitious binder composition comprising ulexite is an efficient mean for the reactivation. The hydration reaction starts immediately after the addition of the activator and proceeds quickly thereafter. This is in particular obvious if compared with the examples C-1 and E-1 of the above table 3.

The invention claimed is:

1. A method for the kinetic regulation of cementitious binders and/or cementitious binder compositions, the method comprising
  1) providing a cementitious binder,
  2) providing at least one borate mineral,
  3) mixing the cementitious binder and the at least one borate mineral in any given order, and
  4) optionally admixing an activator selected from the group consisting of CaO, Ca(OH)$_2$, CaSO$_4$, and combinations thereof,
  the method further comprising 5) grinding the at least one borate mineral,
  wherein a dosage and/or a specific surface area of every borate mineral is chosen in a way that a product P as defined by the equation P=D·(SSA)$^{1/2}$,
  wherein D is the dosage of the respective borate mineral in weight % relative to the cementitious binder and SSA is the specific surface area of the respective borate mineral in m$^2$/g,
  is from 0.01-75.

2. The method according to claim 1, wherein the cementitious binder comprises at least one calcium aluminate cement and/or at least one calcium sulphoaluminate cement.

3. The method according to claim 2, wherein the cementitious binder additionally comprises at least one Ordinary Portland Cement.

4. The method according to claim 3, wherein a weight ratio of the at least one Ordinary Portland Cement to the at least one calcium aluminate cement and/or the at least one calcium sulphoaluminate cement is from 200:1-1:1000.

5. The method according to claim 1, wherein the at least one borate mineral is of natural origin.

6. The method according to claim 1, wherein the at least one borate mineral is selected from the group consisting of calcium borate, calcium metaborate, takedaite, kotoite, frolovite, hexahydroborite, suanite, sussexite, szaibelyite, wiserite, pinnoite, pentahydroborite, calciborite, meyerhofferite, inyoite, colemanite, hydroboracite, howlite, jarandolite, johachidolite, kernite, sborgite, ulexite, larderellite, probertite, tertschite, nasinite, gowerite, tuzlaite, hilgardite, aksaite, admontite, kaliborite, fabianite, nobleite and combinations thereof.

7. The method according to claim 1, wherein the specific surface area of the at least one borate mineral is between 0.1-200 m$^2$/g.

8. The method according to claim 1, wherein the method additionally comprises at least one
  1) drying the at least one borate mineral,
  2) admixing aggregates,
  3) admixing other additives,
  4) admixing water.

9. The method according to claim 1, wherein the activator is admixed to a cementitious binder composition to immediately start a setting and curing reaction.

10. The method according to claim 1, wherein the grinding comprises in-situ grinding of the at least one borate mineral in the presence of the cementitious binder.

* * * * *